US012350856B2

(12) United States Patent
Haas

(10) Patent No.: US 12,350,856 B2
(45) Date of Patent: Jul. 8, 2025

(54) APPARATUS FOR SEPARATING A SAWN TIMBER PACKAGE INTO MAIN AND SIDE PRODUCTS

(71) Applicant: Gebrüder Linck, Maschinenfabrik "Gatterlinck" GmbH & Co. KG, Oberkirch (DE)

(72) Inventor: Albert Haas, Appenweier (DE)

(73) Assignee: Gebrüder Linck, Maschinfabrik "Gatterlinck" GmbH & Co. KG, Oberkirch (DE)

( * ) Notice: Subject to any disclaimer, the term of this patent is extended or adjusted under 35 U.S.C. 154(b) by 444 days.

(21) Appl. No.: 17/981,592

(22) Filed: Nov. 7, 2022

(65) Prior Publication Data

US 2023/0146108 A1 May 11, 2023

(30) Foreign Application Priority Data

Nov. 8, 2021 (DE) ......................... 102021128977.7

(51) Int. Cl.
*B27B 31/00* (2006.01)
*B27B 1/00* (2006.01)

(52) U.S. Cl.
CPC ............ *B27B 31/003* (2013.01); *B27B 1/007* (2013.01)

(58) Field of Classification Search
CPC ....... B27B 31/003; B27B 31/08; B27B 1/007; B27B 15/02; B27B 29/06; B27L 5/006; B27L 1/00; B27L 1/08; B27L 1/10
USPC ................................. 83/14, 23, 27; 414/431
See application file for complete search history.

(56) References Cited

U.S. PATENT DOCUMENTS

| | | | | |
|---|---|---|---|---|
| 3,313,329 | A | 4/1967 | Mitten | |
| 3,401,785 | A | 9/1968 | Ferrari | |
| 4,166,526 | A | 9/1979 | Wykes et al. | |
| 4,503,892 | A * | 3/1985 | Gonner | B27H 1/00 144/120 |
| 4,589,456 | A * | 5/1986 | Traben | B27B 1/00 144/120 |

(Continued)

FOREIGN PATENT DOCUMENTS

| | | |
|---|---|---|
| AT | 017009 | 2/2021 |
| DE | 3030602 | 2/1982 |
| DE | 4337682 | 5/1995 |

(Continued)

*Primary Examiner* — Glenn F Myers
(74) *Attorney, Agent, or Firm* — Volpe Koenig

(57) ABSTRACT

An apparatus for separating a sawn timber package cut from a log into main and side products during longitudinal transport thereof, having at least one separating device positioned such that, during a feed motion of the sawn timber package, it engages in a sawing gap between single- or multi-cut main product and side product and deflects the side product in a direction leading away from the main product. Two rotatably mounted conical rollers form the separating device, each having a circumferential separating edge formed by two surfaces of revolution enclosing an acute angle, and the two conical rollers are arranged on both sides of the sawn timber package and oriented such that they engage laterally into the sawing gap with respective separating edges and roll on the main product with their first surface of revolution, while deflecting the side product from the main product with their second surface of revolution.

9 Claims, 16 Drawing Sheets

(56) References Cited

U.S. PATENT DOCUMENTS 5,146,964 A * 9/1992 Dietz ...................... B27B 31/08
144/369

FOREIGN PATENT DOCUMENTS

| | | |
|---|---|---|
| EP | 0484825 | 10/1991 |
| WO | 8802683 | 1/1988 |
| WO | 02004180 | 1/2002 |

* cited by examiner

APPARATUS FOR SEPARATING A SAWN TIMBER PACKAGE INTO MAIN AND SIDE PRODUCTS

INCORPORATION BY REFERENCE

The following documents are incorporated herein by reference as if fully set forth: German Patent Application No. 10 2021 128 977.7, filed Nov. 8, 2021.

TECHNICAL FIELD

The invention relates to a device for separating a sawn timber package obtained by cutting from a log into main products (3) and side products.

BACKGROUND

In industrial woodworking, boards or comparable products are typically obtained from logs which have a substantially circular cross section. In order to maximize the wood yield, the said boards are produced both from an inner and from an outer cross-sectional region of the log. For this purpose, the log is sawn along its longitudinal axis by means of a sawing apparatus, whereupon the boards are bound spatially and are present in the form of a sawn timber package.

The circular cross section of the sawn log inevitably leads to the boards obtained from the inner cross-sectional region having different dimensions from those boards which originate from the outer cross-sectional region. Those boards of the sawn timber package which are obtained from the inner cross-sectional region are referred to as the main product. The boards from the outer cross-sectional region are referred to as the side product. Both the main and the side product can each be in the form of a single-cut or multi-cut product.

To enable the main boards and the side boards to be used for different purposes, depending on their dimensions, they must be separated from one another. Typically, the separation process required for this is carried out efficiently during the conveying movement of the sawn timber package, an apparatus of the type mentioned at the outset being used.

Such a previously known apparatus is known from AT 17009 U1 and is used for separating a sawn timber package into main and side products. The apparatus comprises a wedge which serves as a separating means and is positioned in such a way that it engages in a sawing gap between the main product and the side product during a feed motion of the timber package. As a result, the side product is deflected in a direction leading away from the main product.

The above-described construction of previously known apparatuses requires optimization since the sawn timber package often jams with the wedge. As a result, the transport of the sawn timber and the subsequent processing steps are interrupted. The release of said jamming is usually carried out manually and is very laborious.

U.S. Pat. No. 3,401,785 A discloses an apparatus in which the separating means used is a conical roller which is mounted so as to rotate about a horizontal axis. During a conveying movement of a sawn timber package, the roller penetrates with a circumferential separating edge into a vertically extending sawing gap of the sawn timber package. As a result, the boards of the sawn timber package are deflected away laterally with respect to the conveying direction of the sawn timber package and are thereby spatially separated. It is disadvantageous that additional bearing means and transport means must be provided to enable the separated boards of the sawn timber package to be transported further.

SUMMARY

The underlying object of the invention is to propose an apparatus having an improved separating means in order to increase the operational safety of the apparatus and to ensure permanently high productivity. For this purpose, the apparatus should be of simple technical construction for the sake of low susceptibility to faults.

The object is achieved by an apparatus having one or more of the features disclosed herein. Advantageous developments can be found below and in the claims.

The apparatus according to the invention is used for separating a sawn timber package obtained by cutting from a log into main products and side products during its longitudinal transport. The apparatus comprises at least one separating means, which is positioned in such a way that, during a feed motion of the sawn timber package, it engages in a sawing gap between the single-cut or multi-cut main product and the side product and deflects the side product in a direction leading away from the main product. During the longitudinal transport of the sawn timber package, the side product is arranged above and/or below the main product. At least two rotatably mounted conical rollers are provided as the separating means, which conical rollers each have a circumferential separating edge which is formed by two surfaces of revolution enclosing an acute angle. The two conical rollers are arranged on both sides of the sawn timber package and are oriented in such a way that they engage laterally in the horizontally extending sawing gap with their respective separating edges and roll on the main product with their first surface of revolution, while they deflect the side product from the main product with their second surface of revolution.

The invention is based on the insight that, due to their geometry and their rotatable mounting, the conical rollers enable reliable separation of the main and side product while the sawn timber package is being transported further in its feed motion. If the sawn timber package impinges upon the conical rollers during its feed motion, the separating edges of the conical rollers each penetrate into the sawing gap. As a result, the conical rollers can each be set in a rotary motion, thus enabling the main product to roll on the conical rollers and ensuring that the sawn timber package is only slightly braked in its feed motion. This prevents jamming between the conical rollers, which are designed as separating means, and the sawn timber package. At the same time, the acute angle between the two surfaces of revolution of the respective conical rollers has the effect that the side product is continuously deflected away from the main product during the further movement of the sawn timber package.

The arrangement according to the invention of two conical rollers makes it possible to separate a sawn timber package produced by horizontal cutting, in which therefore the individual main and side boards are transported stacked one on top of the other, into main and side product. In particular, the invention makes it possible to separate the lowermost side board(s), on which the main board(s) rests (rest), from the latter and to transport them further via a separate transport channel.

By virtue of the fact that the two conical rollers engage in the sawing gap from two sides with respect to the conveying movement of the sawn timber package, opposing separating forces are exerted on the sawn timber package, thus ensuring that both the main product and the side product are centred with respect to the feed motion. In this way, other bearing elements for the sawn timber package, such as laterally arranged guide rollers, can be eliminated or at least relieved since they have to absorb lower lateral forces.

In one embodiment, in which the side product is arranged below the main product, the main product can rest on the conical rollers, while the side product is ejected at the second surfaces of revolution of the conical rollers and, preferably with the aid of gravity, below the main product or is conveyed further in the transport direction via a separate guide channel below the main product. Here, the conical rollers thus serve simultaneously as bearing elements for the main boards and as separating means for the side board(s).

In one embodiment, in which the side product is arranged above the main product, the side product can slide off the main product at the separating edge and, in accordance with the acute angle which the surfaces of revolution enclose, at the respective second surface of revolution of the conical rollers and against the force of gravity. In this region, the apparatus can comprise additional guide means, in particular cylindrical rollers, in order to receive and convey further the side product.

The apparatus preferably comprises at least four conical rollers. In this case, a first pair of the four conical rollers is arranged on both sides of the sawn timber package and is oriented in such a way that the conical rollers of the first pair engage with their respective separating edges laterally in a first sawing gap, which is formed between the main product and a side product resting on the main product. In this case, a second pair of the four conical rollers is arranged on both sides of the sawn timber package and is oriented in such a way that the conical rollers of the second pair engage with their respective separating edges laterally in a second sawing gap, which is formed between the main product and a side product arranged below the main product.

The invention is not restricted to a specific geometry of the respective conical rollers, and it is therefore possible, in principle, to use different solids of revolution. The only essential point is that the conical rollers each have two surfaces of revolution which, at their common separating edge, enclose the acute angle, which can be, for example, 45°.

The conical rollers can consist of metal, plastic, rubber or a combination of the materials mentioned. The conical rollers preferably each have a bore for accommodating one or more bearing elements, in particular rolling bearings. By means of the bearings, the conical rollers can be rotated in a structurally simple manner and, at the same time, can be mounted in a stationary or movable manner on a machine frame of the apparatus according to the invention.

Stationary mounting is advantageous if the apparatus according to the invention is used to separate sawn timber packages with uniform dimensions and the position of the sawing gap between the main product and the side product does not vary significantly between different sawn timber packages. Adjustable mounting of the conical rollers is advantageous if the positions of their separating edges are to be set as a function of varying sawn timber package dimensions and sawing gap positions.

It is advantageous if at least the respective second surface of revolution of the conical rollers has a convex curvature in profile. It is thereby possible to optimize the pressure distribution in the corresponding conical roller during the engagement of its separating edge in the sawing gap. The separating edge in particular is thereby relieved during the separation process.

In an advantageous development, the conical rollers each have a lateral surface and a flat base surface, wherein the respective lateral surface forms the first surface of revolution and the respective base surface forms the second surface of revolution.

According to the above-described development, the conical rollers are mounted in such a way that their respective lateral surfaces roll on the main product, while the side product is deflected at the respective base surfaces. In this case, the orientation of the conical rollers and of their axis of rotation is not a critical factor. The only essential point is that the separating edges of the conical rollers engage in the sawing gap of the sawn timber package.

In an advantageous development, the conical rollers are each mounted so as to be rotatable about an axis of rotation and are oriented in such a way that the respective axis of rotation encloses an acute angle of inclination, in a plane of inclination which is directed orthogonally to the feed motion, with a sawing gap plane formed by the sawing gap, and the main product bears at least partially on the respective separating edge and preferably on the respective lateral surface.

In one possible embodiment of the above-described development, the angle of inclination is smaller than the acute angle which is enclosed by the lateral surface and the base surface. After the separating edges have penetrated into the sawing gap, the main product therefore rests on the separating edges, with the result that essentially two point contacts are formed between the main product and the conical rollers. This results during the separating process in low friction between the main product and the conical rollers on which it rolls.

Alternatively, the angle of inclination corresponds substantially to the acute angle which is enclosed by the lateral surface and the base surface. In this case, the conical rollers are mounted in such a way that their lateral surfaces in each case roll along a linear contact on the main product. In comparison with the embodiment in which the main product rests on the separating edges, increased friction is admittedly produced in this case. However, the separating edge can be mechanically relieved since the weight of the main product is better distributed on the surfaces of the conical rollers.

In an advantageous development, the respective axis of rotation forms an acute angle of incidence with the plane of inclination in the sawing gap plane. The base surfaces of the conical rollers each face counter to the feed motion of the sawn timber package and each serve as a sliding plane for the side product to be deflected.

The reliability of the separation process is further improved with the advantageous development described above. This is because the oblique position of the conical rollers, in which the above-described acute angle of incidence (or camber) is formed in each case, ensures that the base surface faces counter to the feed motion of the sawn timber package in such a way that the side product is guided over the flat base surfaces of the conical rollers by the main product in the manner of a ramp. The sliding planes formed in this way permit geometrically defined guidance of the side product by the main product.

In an alternative advantageous development, the conical rollers each likewise have a lateral surface and a flat base surface, but the base surfaces each form the first surface of revolution and the lateral surfaces each form the second surface of revolution.

In the further development described above, the conical rollers are mounted in such a way that the base surfaces roll on the main product, while the lateral surfaces serve to deflect the side product. The conical rollers are preferably mounted in such a way that the base surfaces each extend substantially parallel to the sawing gap plane formed by the sawing gap. The axes of rotation of the conical rollers each extend orthogonally to the abovementioned sawing gap plane. If, in the case of such an arrangement, the separating edges penetrate into the sawing gap of the sawn timber package, the main product thus bears over the entire area against the base surfaces, while the side product is deflected at the lateral surfaces.

In an advantageous development, the conical rollers, the base surfaces of which in each case form the first surfaces of revolution and the lateral surfaces of which in each case form the second surfaces of revolution, are set at an angle in such a way that their axes of rotation in each case enclose an acute tilting angle with the sawing gap plane in a tilting plane which is directed parallel to the feed motion and orthogonally to the sawing gap plane. In this case, the base surfaces face in the feed direction.

In other words, the respective axes of rotation of the conical rollers are tilted counter to the feed direction, with the result that the base surfaces of the conical rollers do not rest over their entire surface on the main product during the separation process. Instead, the respective base surfaces and the sawing gap plane formed by the sawing gap likewise enclose the tilting angle, which is open in the direction of the feed motion. This reduces the friction between the respective base surface and the main product.

In an advantageous development, the conical rollers each have a drive, which is configured to impart a rotational movement to each of the conical rollers about its respective axis of rotation. In this case, the conical rollers have a tangential speed, in the region of the respective separating edge engaging in the sawing gap, which is directed at least partially in or counter to the feed motion.

The development described above is based on the insight that the rotational movements of the conical rollers relative to the feed motion promote the reliability of the separation process. The fact that the two conical rollers engage on opposite sides in the sawing gap of the sawn timber package and, in the process, are set into an oppositely directed rotational movement increases the forces acting laterally on the sawn timber package as a result of friction. In this way, the main product and the side product are better centred during the separation process. The drive also ensures that the rotary bearings of the conical rollers do not become dirty and stiff over time owing to dust and chips which inevitably occur during a sawing operation, since the conical rollers are always in motion.

In a simple manner, the abovementioned drive can comprise an electric machine. Furthermore, a transmission and/or a clutch can be provided, in particular in order to be able to convert the drive movement of the electric machine. The drive is preferably configured to be controllable and has a signal link to an electric control unit of the apparatus.

In an advantageous development, the apparatus has a centring unit, which is arranged in front of the conical rollers, based on the feed direction. The centring unit is designed to align the sawn timber package with respect to the separating means during the feed motion.

In a structurally simple manner, the centring unit can comprise one or more cylindrical rollers, by means of which the sawn timber package is guided. These rollers are preferably driven and support the feed motion of the sawn timber package. Such a cylindrical roller is preferably mounted so as to be adjustable in such a way that its displacement brings about a corresponding displacement of the sawn timber package. Such a centring unit preferably comprises at least one adjusting means, which is configured in a simple manner as an electric or hydraulic linear actuator. The centring unit can have a signal link to the control unit of the apparatus, it being possible for the adjustment to take place as a function of an expected sawn timber dimension and/or an expected position of the sawing gap in the sawn timber package.

It is within the scope of the advantageous development that a sensor, in particular an optical sensor, is configured to detect the sawn timber dimension and/or a sawing gap position within the sawn timber package by measurement. Preferably, such a sensor is arranged upstream of the centring unit, based on the feed motion of the sawn timber package, and is designed as an optical sensor, in particular as a camera, by means of which the sawn timber package is detected in an end-face region. Preferably, the optical sensor is configured with an integrated evaluation unit or the control unit is configured to determine the position of the sawing gap in the sawn timber package by means of digital image processing method. The control unit effects the adjustment of the centring unit as a function of the measurement signal in order to adapt the sawn timber package with the sawing gap to the position of the separating edge.

In an advantageous development, the apparatus comprises a positioning device, which is configured to move and/or rotate each of the conical rollers with respect to at least one adjustment axis relative to the sawn timber package.

In a simple embodiment, the apparatus comprises a positioning device which is configured to position each of the conical rollers in a plane directed orthogonally to the feed motion as a function of a position of the sawing gap in the sawn timber package and to adapt the positions of the separating edges of the conical rollers to the position of the sawing gap.

The positioning device can comprise at least one electric or hydraulic linear actuator, which has a signal link to the electric control unit. In this case, the linear actuator serves to move the conical rollers in each case along a linear path. In this case, the movement can take place in any desired spatial direction and thus in or counter to the feed direction and/or transversely thereto. It is also within the scope of the advantageous development that the positioning device is configured to adjust the angle of inclination and/or the angle of incidence and/or the tilting angle of the respective conical roller before and/or during the separation process.

In particular, it is possible by means of the positioning device to feed the conical rollers dynamically during the separation process and thereby to exert a positive effect on the separation process. This is advantageous since in this way the path of movement of the deflected side product can be influenced or the side product can be lifted off from the main product.

BRIEF DESCRIPTION OF THE DRAWINGS

Further advantages are explained with reference to exemplary embodiments and the figures. More specifically.

DETAILED DESCRIPTION

Figure 1:
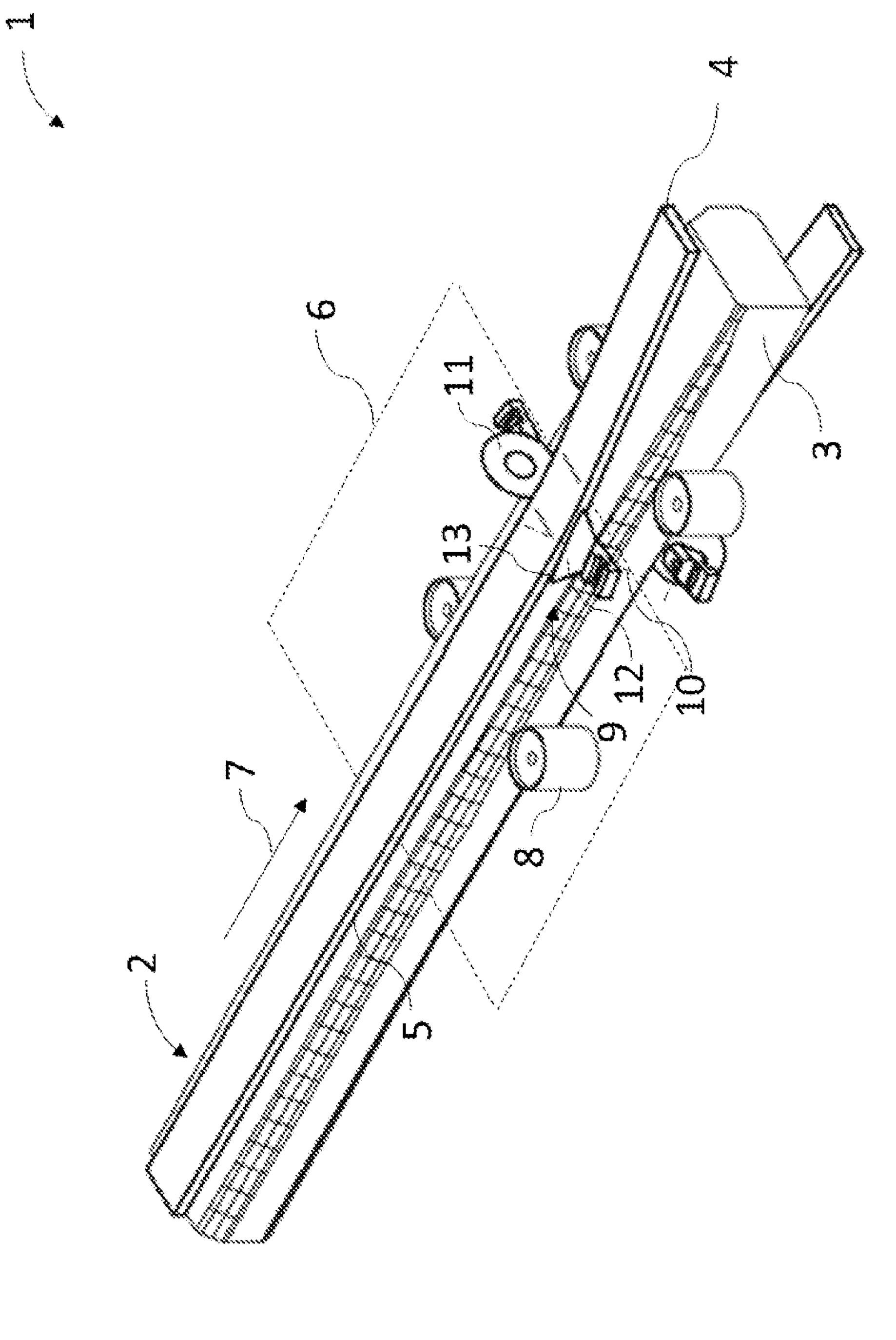
FIG. 1 shows a first exemplary embodiment for an apparatus having a conical roller arrangement for separating a sawn timber package in an isometric view.

FIG. 1 shows an apparatus 1 for separating a sawn timber package 2. The sawn timber package 2 originates from a tree trunk with a substantially circular cross section. In the example shown, the tree trunk was processed in such a way that a single-cut beam, which is referred to below as the main product 3, was obtained from the inner cross-sectional region. The boards obtained from the outer cross-sectional region of the tree trunk, which rest against the upper side and the lower side of the main product, are referred to as the side product 4. In the following, for greater ease of understanding, reference is made only to the side product 4 arranged above the main product 3.

The main product 3 is separated from the side product 4 by a sawing gap 5. In this case, the sawing gap 5 lies in a horizontally extending sawing gap plane 6, which is shown as an aid.

The sawn timber package 2 shown in FIG. 1 is conveyed along a feed direction 7 by means of a conveying device (not shown), the main product 3 being guided laterally by means of four cylindrical rollers 8. For greater clarity, only one cylindrical roller 8 is provided with a reference sign.

As a result of the feed motion, the sawn timber package 2 reaches the apparatus 1, which comprises four separating means designed as conical rollers 9. The conical rollers 9 are arranged in an axially symmetrical manner with respect to the sides of the sawn timber package 2, based on the feed direction 7. For greater clarity, not all the cylindrical rollers 9 are provided with a reference sign.

The conical rollers 9 are each of frustoconical design and each have an axis of rotation 10, about which they are mounted so as to rotate freely. Furthermore, the conical rollers 9 each have a base surface 11 and a lateral surface 12, which enclose an acute angle of approximately 45° and are delimited by a circumferential separating edge 13.

The conical rollers 9 are solid and produced from steel and have a correspondingly high mechanical rigidity. During the feed motion of the sawn timber package 2, the conical rollers serve to separate the side product 4 from the main product 3. For this purpose, in each case one conical roller 9 penetrates with its circumferential separating edge 13 into the sawing gap 5 of the sawn timber package 2. In this case, the side product 4 slides along the base surfaces 10 of the conical rollers 9 transversely to the feed direction 7, while the main product 3 rolls on the lateral surfaces 12 and is conveyed further in the feed direction 7. The positions and orientations of the conical rollers 9 with respect to the sawn timber package 2 are explained in detail with reference to FIGS. 2 to 4.

Figure 2:
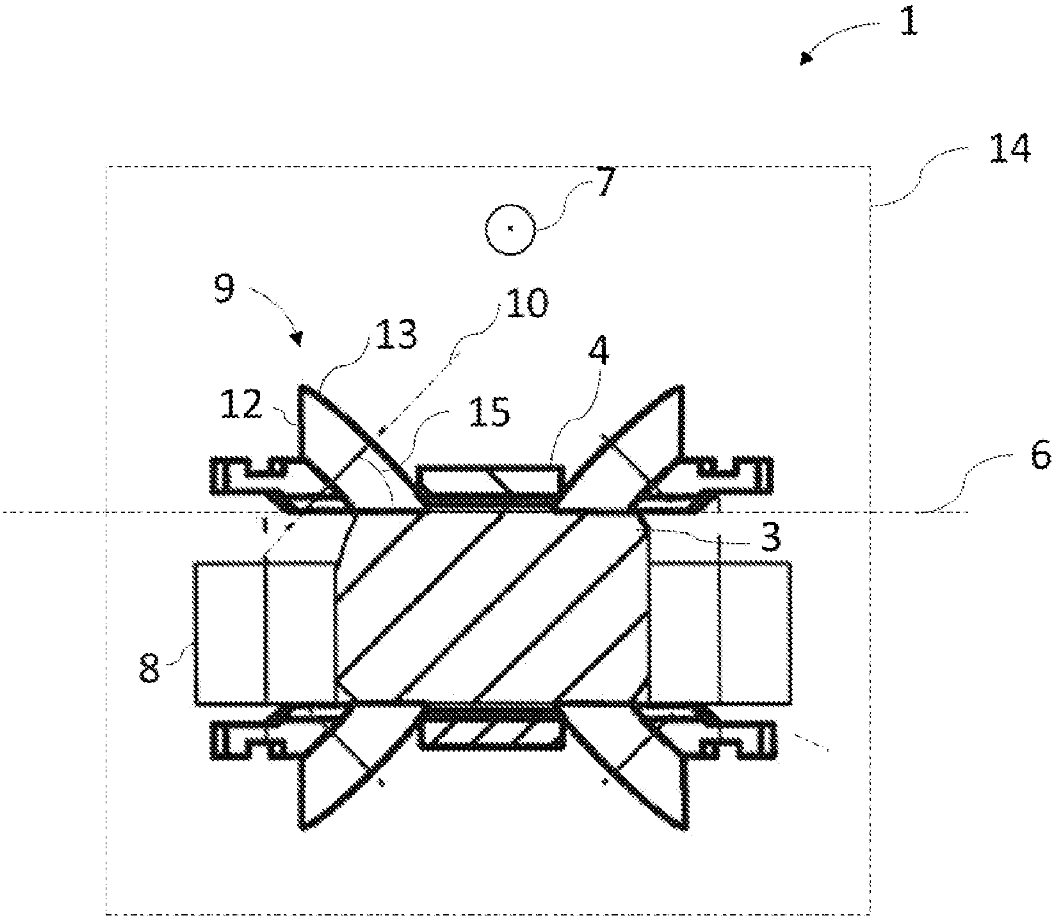
FIG. 2 shows the first exemplary embodiment in a front view.

FIG. 2 shows the apparatus 1 shown in FIG. 1 in a front view. As has already been described with reference to FIG. 1, the conical rollers 9 each have a lateral surface 12 and a circumferential separating edge 13. In FIG. 2, the base surfaces of the conical rollers 9 shown face into the plane of the drawing and are therefore not visible.

The feed motion of the sawn timber package 2 takes place along the feed direction 7, which, according to FIG. 2, is directed out of the plane of the drawing and is oriented orthogonally to a plane of inclination 14 inserted as an aid. The respective axes of rotation 10 of the conical rollers 9 are set at an angle and each enclose an acute angle of inclination 15 with the sawing gap plane 6 in the plane of inclination 14.

The angle of inclination 15 is selected as a function of the geometry of the conical rollers 9 and corresponds to the acute angle between the base surface and the lateral surface 12 of the conical rollers 9. This has the effect that, during the separation process, the main product 3 in each case rests on or against the lateral surfaces 12 along a profile line and rolls on the conical rollers 9 via the latter. In an alternative embodiment, the angle of inclination set can be smaller, with the result that the main product 3 rolls on the separating edges 13 of the conical rollers 9 in each case via a point contact.

Figure 3:
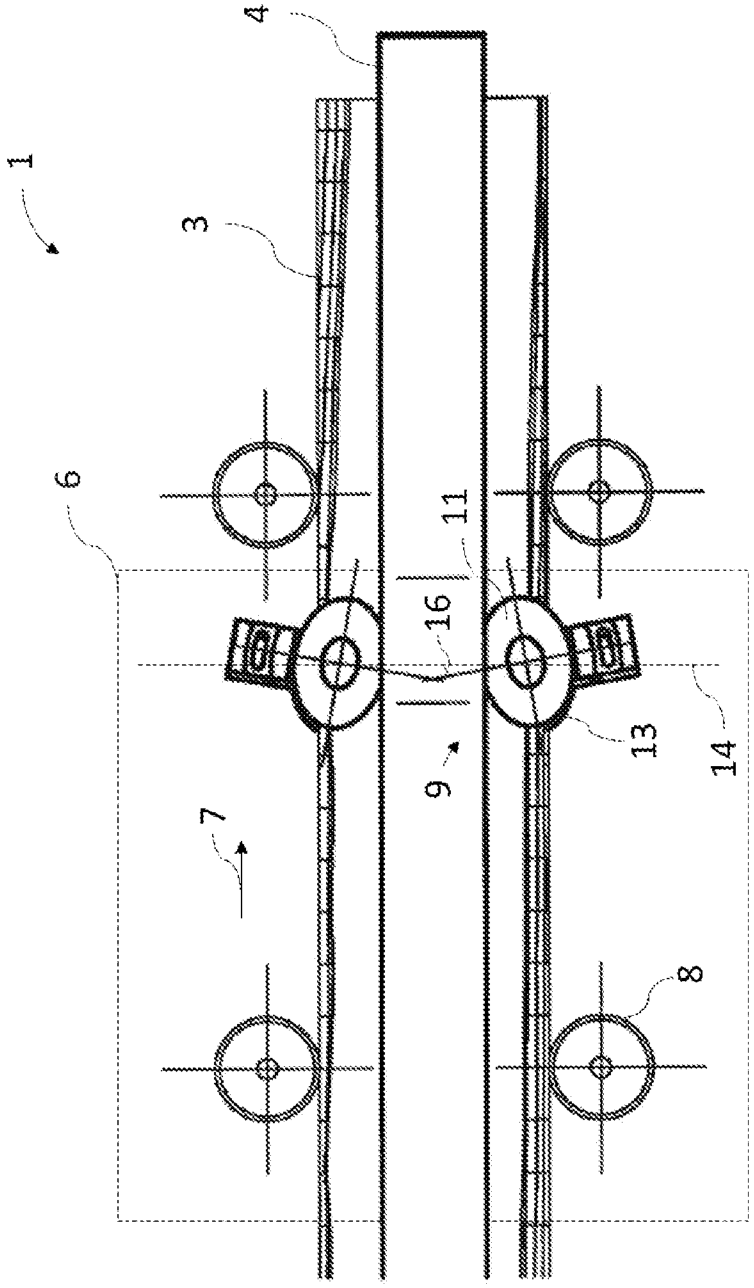
FIG. 3 shows the first exemplary embodiment in plan view.

FIG. 3 shows the apparatus 1 shown in FIGS. 1 and 2 in plan view. According to FIG. 3, the visible base surfaces 11 of the conical rollers 9 face out of the plane of the drawing, which extends parallel to the sawing gap plane 6. As can be seen from FIG. 3, the conical rollers 9 are also mounted in such a way that their respective axes of rotation 10 enclose an acute angle of incidence 16 (or camber) with the plane of inclination 14 in the sawing gap plane 6. This arrangement has the effect that the base surfaces 11 of the conical rollers 9 are turned counter to the feed direction 7 in accordance with the angle of incidence 16. As a result, the base surfaces 11 each form a sliding plane for the side product 3, on which the side product 3 slides off from the main product 4.

Figure 4:
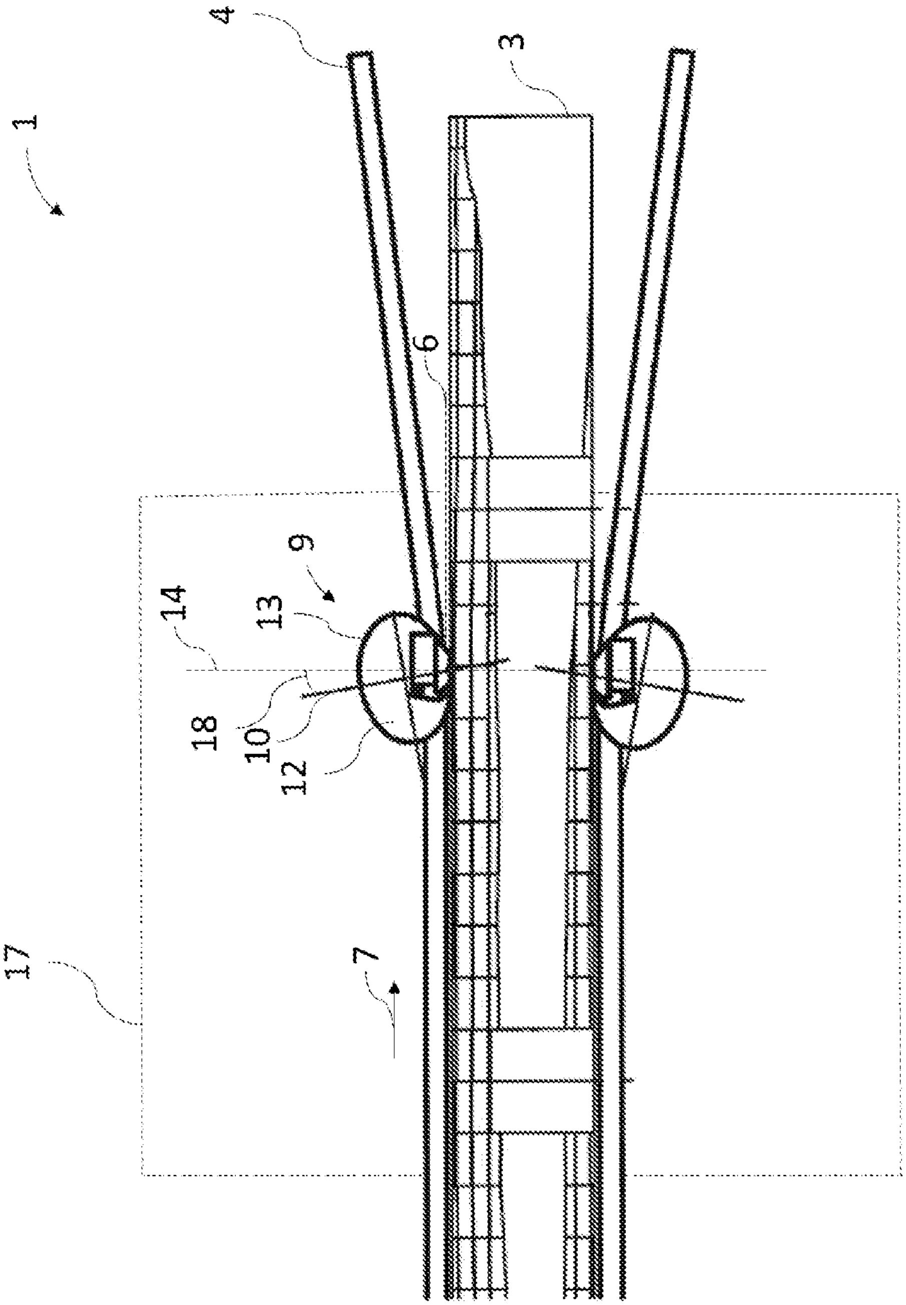
FIG. 4 shows the first exemplary embodiment in a side view.

FIG. 4 shows the apparatus 1 shown in FIGS. 1 and 3 in a side view. As can be seen from FIG. 4, the conical rollers 9 are mounted in such a way that their axes of rotation 10 enclose an acute tilting angle 18 in the plane of the drawing, which extends parallel to the tilting plane 17 inserted as an aid, and with the plane of inclination 14.

The conical rollers 9 shown in FIGS. 1 to 4 are mounted adjustably in a manner not shown. For this purpose, the apparatus 1 has a total of four positioning devices, one of which is shown in different views in FIGS. 5 to 8.

Figure 5:
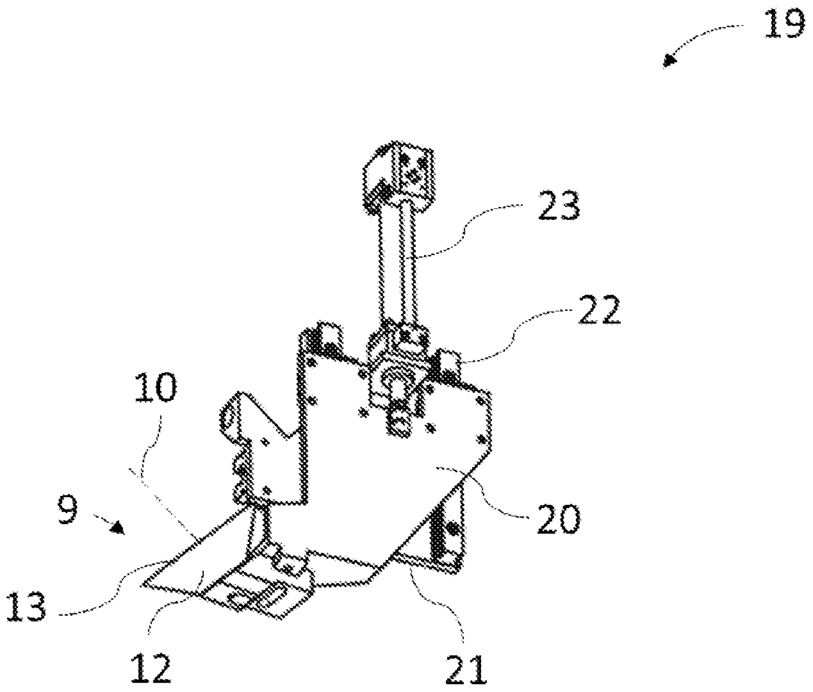
FIG. 5 shows a positioning device having a conical roller mounted in accordance with the first exemplary embodiment in an isometric view.

FIG. 5 shows a positioning device 19 with a holder 20, on which a conical roller 9 is mounted in a freely rotatable manner. In a manner not shown here, the conical roller 9 has, along its axis of rotation 10, a bore which accommodates rolling bearings that permit free rotation of the conical roller 9 relative to the holder 20 and about the axis of rotation 10. In an alternative embodiment, a drive for the conical roller 9 can be arranged on the holder 20 in order to positively impart rotation to the latter.

The positioning device 19 likewise has a fastening element 21, which serves to fix the positioning device 19 in a fixed location, for example on a machine frame. In order to allow displacement of the conical roller 9, the holder 20 is mounted by means of a guide 22 so as to be adjustable with respect to the fastening element 21. Furthermore, a hydraulic linear actuator 23 is arranged between the holder 20 and the fastening element 21. In this case, the linear actuator 23 has an adjustment axis which corresponds to the guidance axis of the guide 22. By means of suitable control of the linear actuator 23, automated adjustment of the holder 20 and of the conical roller 9 arranged thereon with respect to the fastening element 21 is thus possible. This is advantageous if the positioning device 19 with the conical roller 9 arranged thereon is used in apparatuses which serve to separate sawn timber packages of greatly varying dimensions. This is because adjusting the conical roller 9 also adjusts its separating edge 13, thus enabling it to be adapted to the position of a sawing gap in a sawn timber package.

Figure 6:
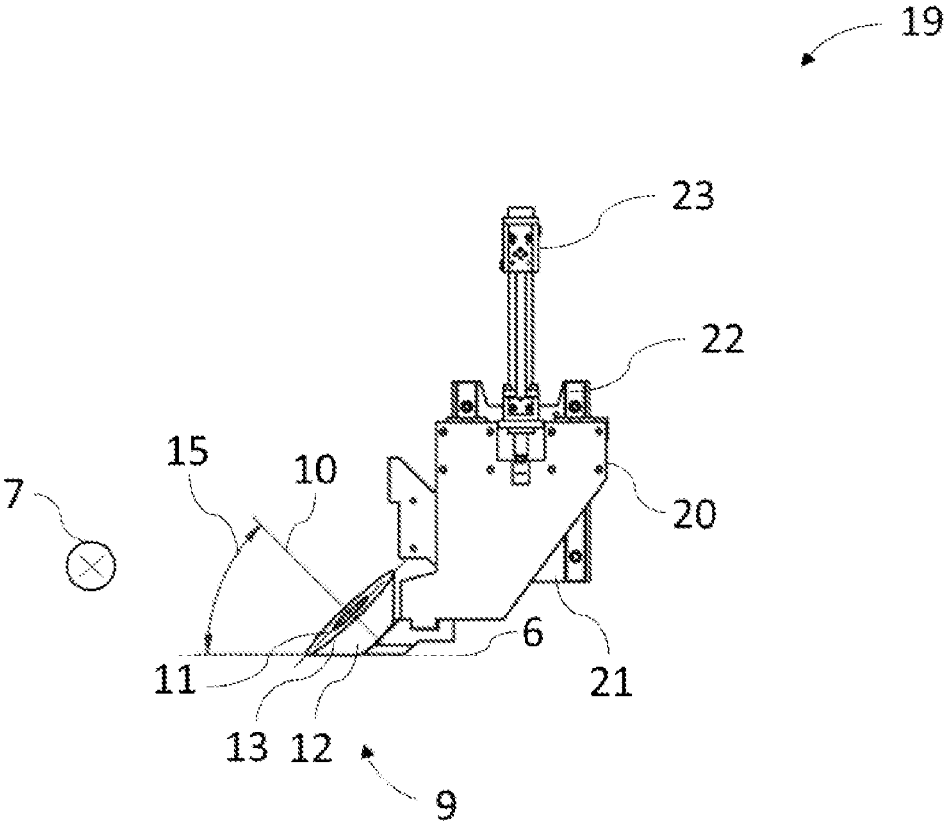
FIG. 6 shows the positioning device in a front view.

FIG. 6 shows the positioning device 19 shown in FIG. 5 in a front view. In an intended installation position of the positioning device 19, the feed direction 7 of a sawn timber package to be separated points into the plane of the drawing.

Analogously to the explanations with respect to FIGS. 1 to 4, the conical roller 9 is set at an angle in such a way that the axis of rotation 10 encloses an acute angle of inclination 15 in the plane of the drawing with the sawing gap plane 6 shown here. The lower profile line on the lateral surface 12 of the conical roller 9 extends substantially horizontally and thus parallel to the sawing gap plane (not shown). Thus, if a sawn timber package is moved along the feed direction 7, the separating edge 13 penetrates into the sawing gap of the sawn timber package in the manner already explained, wherein the conical roller 9 rolls on the main product in the region of the horizontally extending profile line. The side product slides over the base surface 11 and is directed away from the main product transversely to the feed direction 7.

Figure 7:
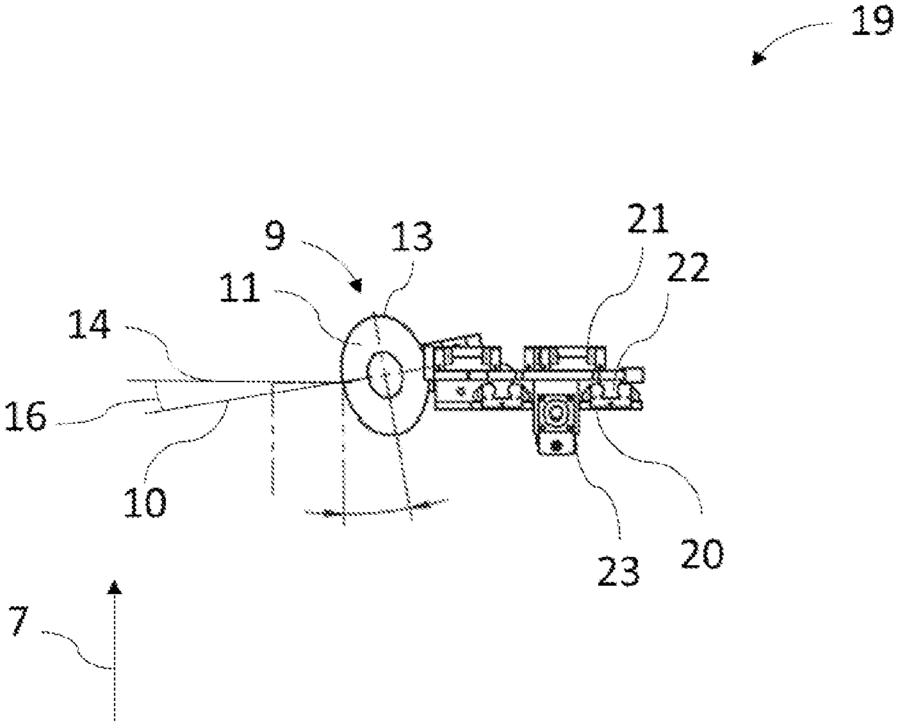
FIG. 7 shows the positioning device in plan view.

FIG. 7 shows the positioning device 19 shown in FIGS. 5 and 6 in plan view. For better comprehension of the intended installation position of the positioning device 19, the feed direction 7 of a sawn timber package is again shown. As already explained with reference to FIG. 3, the conical roller 9 is set at an angle in such a way that its axis of rotation 10 encloses an acute angle of incidence 16 (or camber) in the plane of the drawing with the plane of inclination 14, shown here as an aid.

Figure 8:
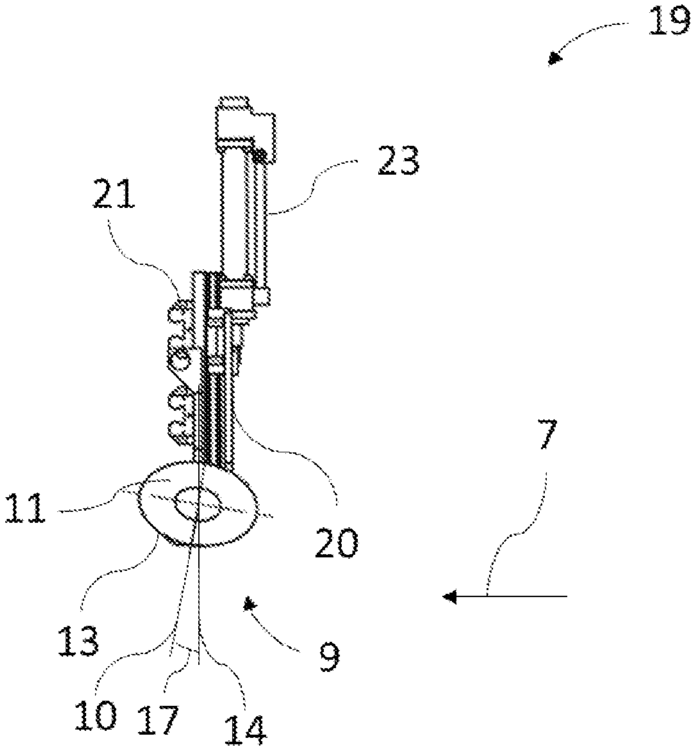
FIG. 8 shows the positioning device in a side view.

FIG. 8 shows the positioning device 19 illustrated in FIGS. 5 to 7 in a side view. The conical roller 8 is set at an angle in such a way that its axis of rotation 10 forms an acute tilting angle 17 with the plane of inclination 14 in the plane of the drawing, as already explained with reference to FIG. 4.

Figure 9:
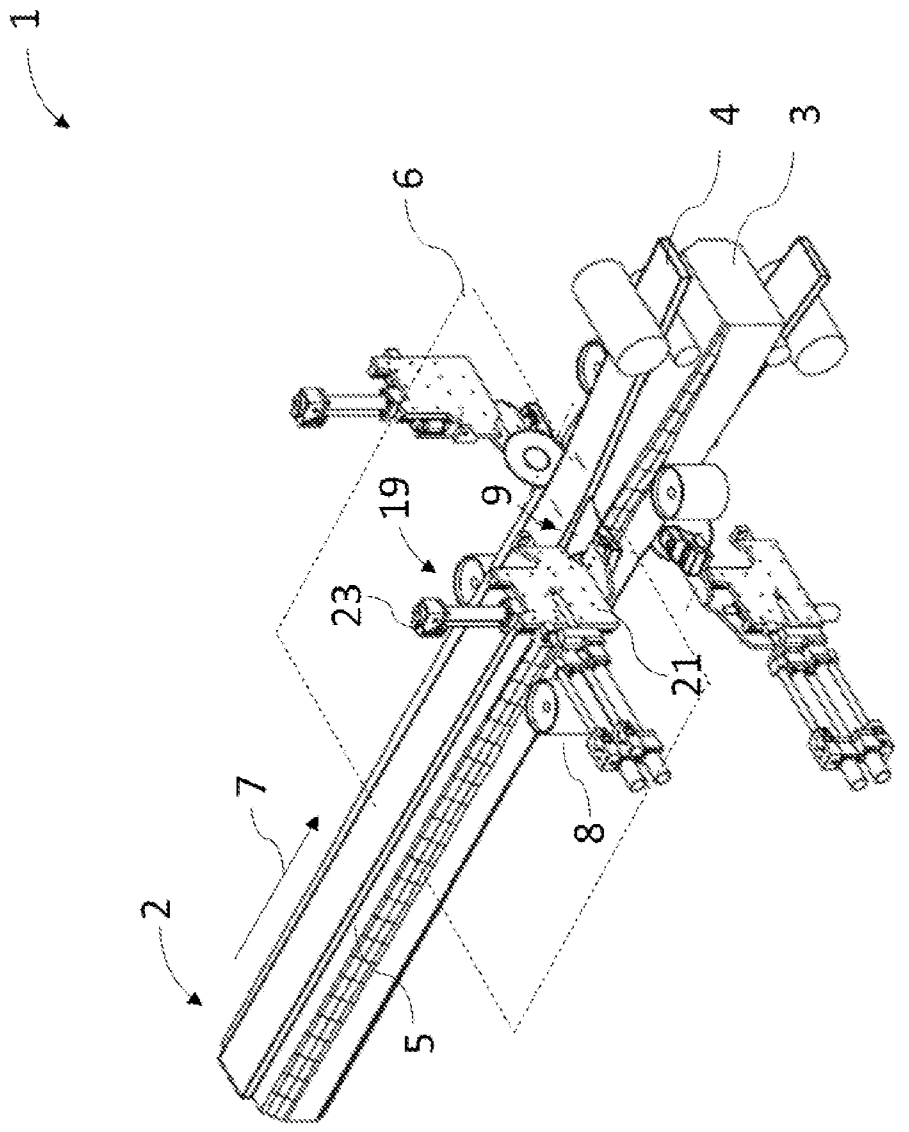
FIG. 9 shows the first exemplary embodiment of the apparatus for separating the sawn timber package with four positioning devices.

FIG. 9 shows the apparatus 1 according to FIGS. 1 to 4, the four conical rollers 9 of which are each mounted on a positioning device 19 in a manner corresponding to FIGS. 5 to 8. For greater clarity, just one positioning device 19 and components arranged therein are provided with reference signs.

In the exemplary embodiment shown, a camera system (not shown) determines the structure and the geometry of the sawn timber package 2 before the separation step and transmits the data obtained during this process to an evaluation and control unit. The information collected contains both the external dimensions of the sawn timber package and the position and the dimensions and the profile of the sawing gap 6 within the sawn timber package 2. This information is used in the evaluation and control unit to control the linear actuators 23 in order to adjust the conical rollers 9 in such a way that their respective separating edges are adapted to the position of the sawing gap 5. Alternatively, the dimension of the sawn timber package and the position of the saw cuts can also be obtained from a cutting solution obtained by calculation on the basis of an optical measurement of the tree trunk and/or from a setting of the preceding sawing apparatus resulting therefrom.

Additionally or alternatively, the conveying device can also comprise a centring unit which is configured to adjust the sawn timber package 2 in the plane of inclination 14 (not shown here) and to adapt the position of the sawing gap 5 to the positions of the separating edges of the conical rollers 9.

Figure 10:
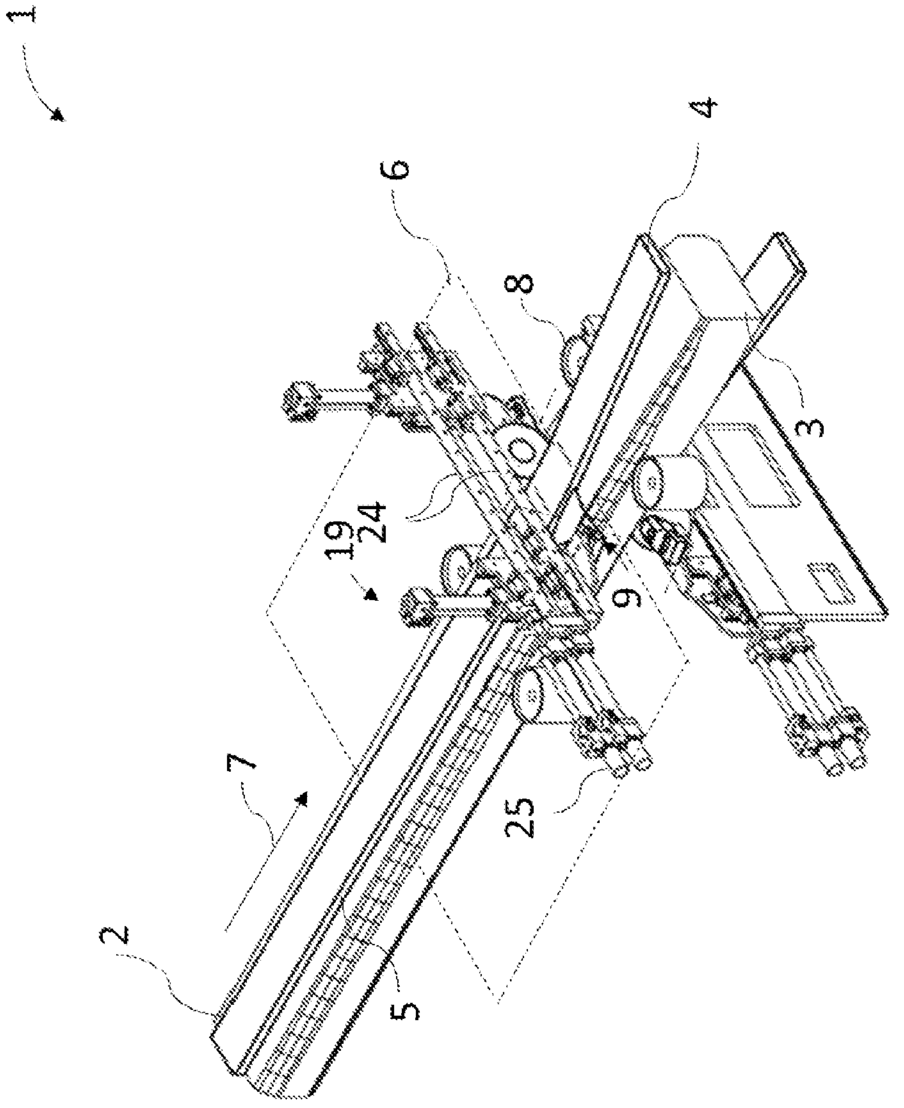
FIG. 10 shows the first exemplary embodiment of the apparatus for separating the sawn timber package with four horizontally adjustable positioning devices.
Figure 11:
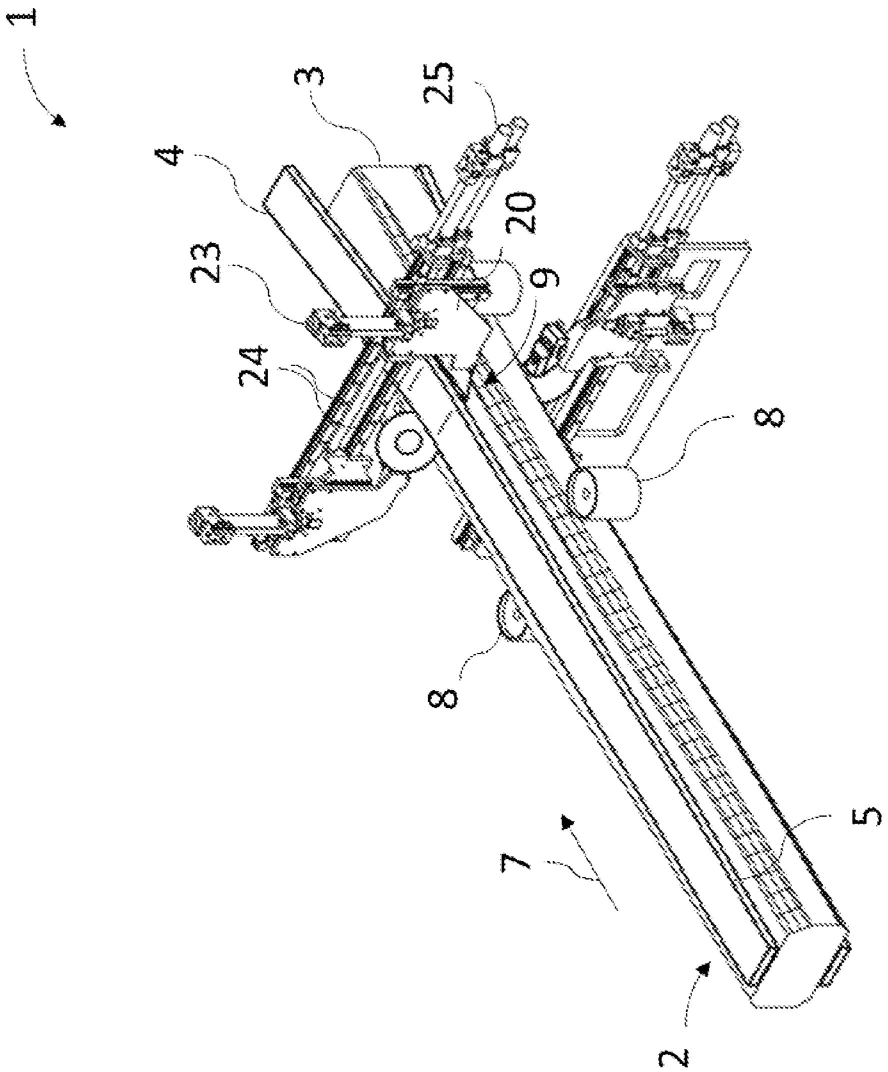
FIG. 11 shows the first exemplary embodiment of the apparatus for separating the sawn timber package with four horizontally adjustable positioning devices in a rear view.

FIG. 10 shows an apparatus 1 which has the same components as the apparatus 1 shown in FIG. 9. In contrast to the arrangement shown in FIG. 9, the positioning devices 19, which are arranged in pairs above or below the sawn timber package 2, are mounted in a horizontally adjustable manner on a horizontally extending guide 24. In each case one hydraulic linear actuator 25 is provided to move one of the positioning devices 19 and the conical rollers 9 mounted thereon along the guide 24. As a result, the conical rollers 9 and the positions of their respective separating edges 13 can be adapted not only to a vertical position of the sawing gap 5 but additionally also to a width dimension of the sawn timber package 2. FIG. 11 shows the exemplary embodiment shown in FIG. 10 in a rear view.

FIGS. 12 to 15 show a second exemplary embodiment of an apparatus 1 for separating a sawn timber package 2 obtained from a log. This is of substantially the same construction as the apparatus 1 shown in FIGS. 10 and 11 but differs from it in the installation position of the conical rollers 9. The axes of rotation of the conical rollers 9 extend orthogonally through the sawing gap plane 6.

Figure 12:
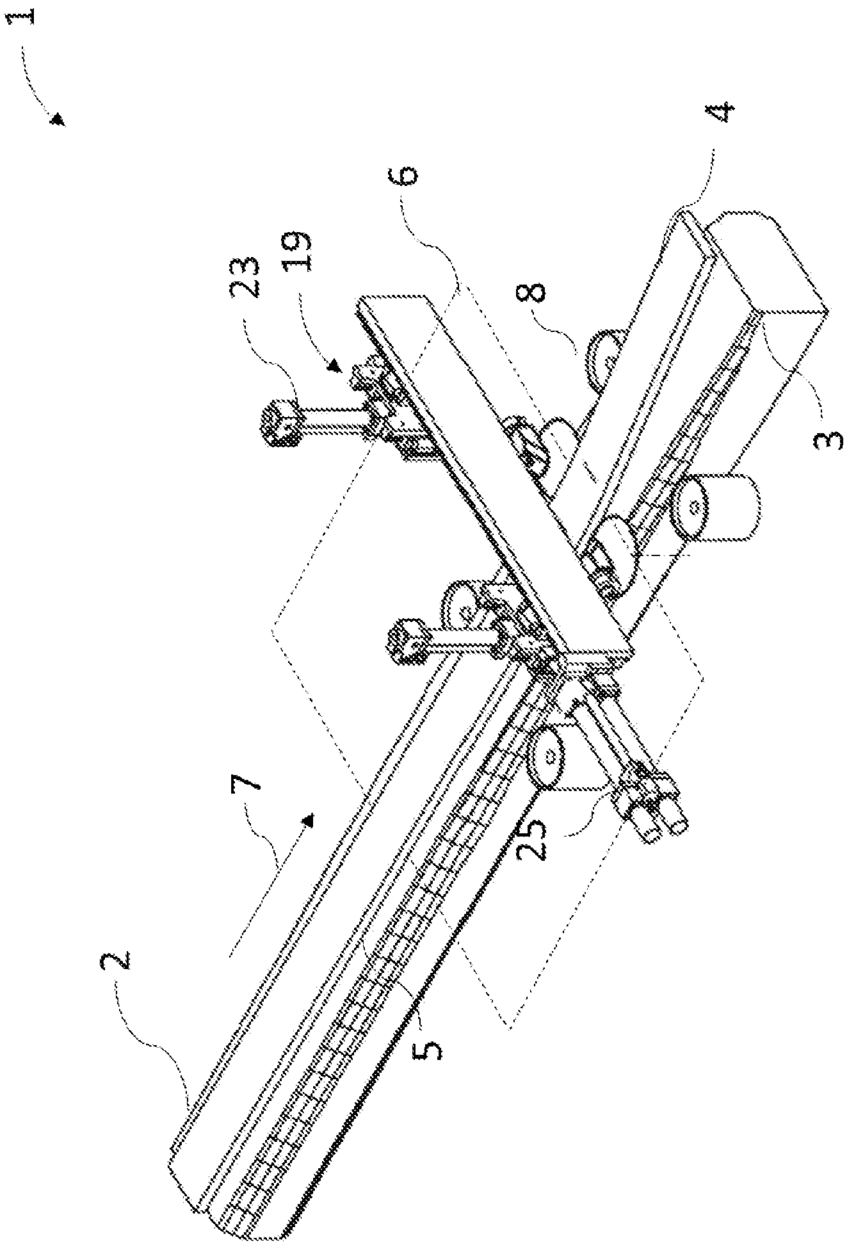
FIG. 12 shows a second exemplary embodiment for an apparatus having a conical roller arrangement for separating a sawn timber package in an isometric view.
Figure 13:
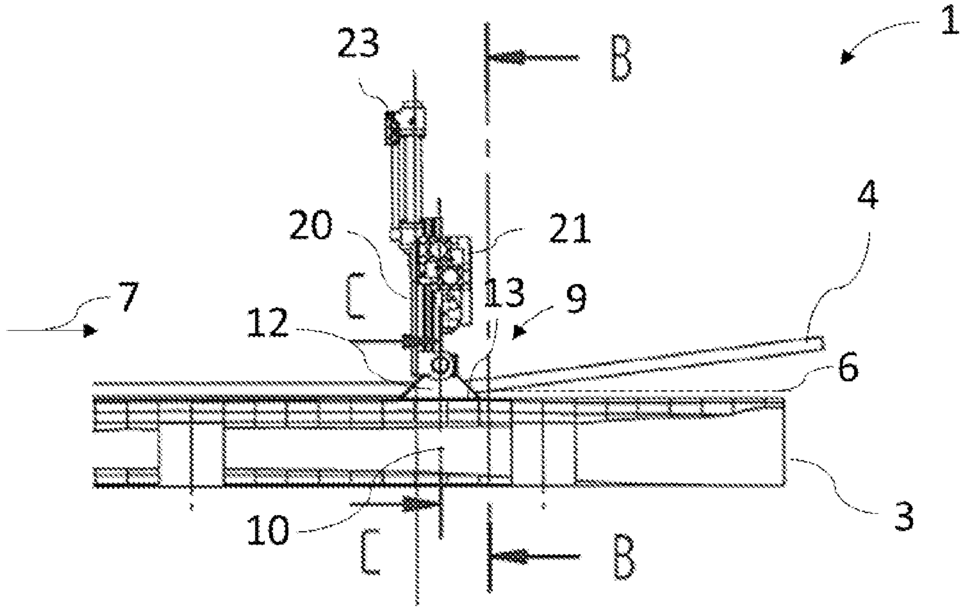
FIG. 13 shows the second exemplary embodiment in a side view.

FIG. 13 shows the apparatus 1 shown in FIG. 12 with one of the total of four conical rollers 9. As explained above, the axis of rotation 10 of the conical roller 9 extends orthogonally with respect to the sawing gap plane 6. During the separation process, the base surface of the conical roller 9 rests flat on the main product 3, while the side product 4 is deflected from the main product 3 via the lateral surface 12. In an alternative embodiment, the axis of rotation 10 can be tilted by a tilting angle in the plane of the drawing, with the result that the base surface does not rest over its entire surface on the main product. Instead, the base surface encloses with the sawing gap plane an acute angle which corresponds to the tilting angle and is open in the feed direction 7.

Figure 14:
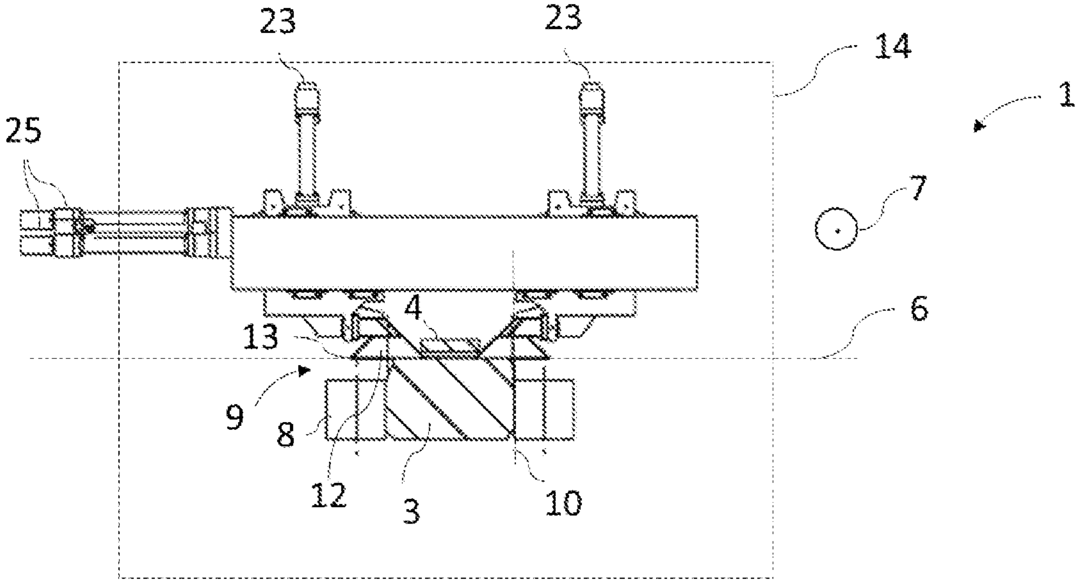
FIG. 14 shows the second exemplary embodiment in a first front view.
Figure 15:
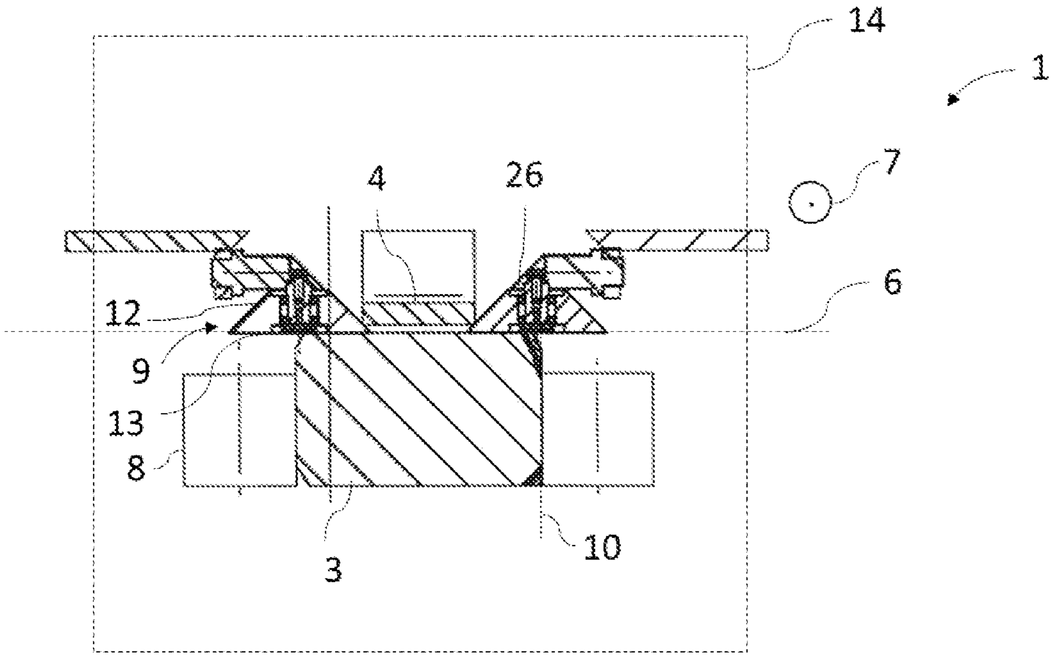
FIG. 15 shows the second exemplary embodiment in a second front view.

The sections shown in FIG. 13 are shown in FIGS. 13 and 15. Section B-B corresponds to the illustration in FIG. 14, while section C-C corresponds to the illustration in FIG. 15.

FIG. 14 shows that, during the separation process, the conical rollers 9 bear with their respective base surfaces against the main product 3, while the side product 4 is deflected via the lateral surface 12 transversely with respect to the feed direction 7. By means of the actuators 23 and 25, a vertical or a horizontal movement of the conical rollers 9 is possible in order to adapt the positions of the separating edges 13 to the position of the sawing gap 5.

The mounting of the conical rollers 9 is shown by means of the sectional illustration shown in FIG. 15. In the manner already described, the conical rollers each have a bore, in which rolling bearings 26 are accommodated. The rolling bearings serve to support the conical rollers 9 in a freely rotatable manner, wherein the axes of rotation 10 extend orthogonally to the sawing gap plane 6.

Figure 16:
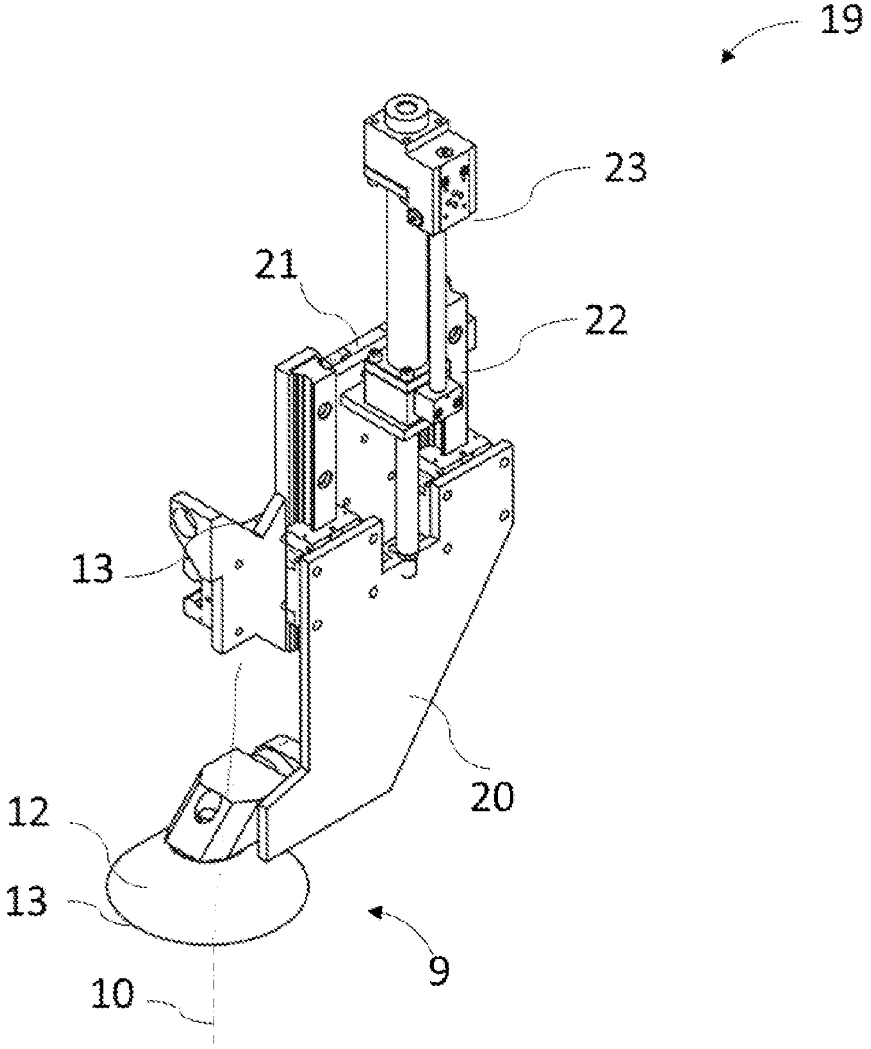
FIG. 16 shows a positioning device having a conical roller mounted in accordance with the second exemplary embodiment in an isometric view.

FIG. 16 shows one of the positioning devices shown in FIGS. 10 to 15. The positioning device 19 is constructed substantially identically to the positioning device according to FIG. 5. However, in the manner already explained, the conical roller 9 shown in FIG. 16 is arranged in such a way that the base surface faces away from the holder 9 and, in an intended installation position, is turned towards the main product during the separation process.

The invention claimed is:

1. An apparatus (1) for separating a sawn timber package (2) obtained by cutting from a log into main products (3) and side products (4) during a longitudinal transport thereof, the apparatus comprising:

- at least one separating means (9) positioned such that during a feed motion of the sawn timber package (2), the at least one separating means (9) engages in a sawing gap (5) between single-cut or multi-cut portions of the main product (3) and the side product (4) and deflects the side product (4) in a direction leading away from the main product (3);
- the side product (4) is arranged at least one of above or below the main product (3) during the longitudinal transport of the sawn timber package (2);
- the separating means (9) comprises two rotatably mounted conical rollers (9), and the conical rollers each have a circumferential separating edge (13) which is formed by two surfaces of revolution (11, 12) enclosing an acute angle, and
- the two conical rollers (9) are arranged on both sides of the sawn timber package (2) and are oriented such that the two conical rollers (9) engage laterally in the sawing gap (5) with respective separating edges (13) thereof and roll on the main product (3) with said first surfaces of revolution (11, 12), and deflect the side product (4) from the main product (3) with said second surfaces of revolution (11, 12).

2. The apparatus (1) according to claim 1, wherein the conical rollers (9) each have a lateral surface (12) and a flat base surface (11), and the respective lateral surface (12) forms the first surface of revolution and the respective base surface (11) forms the second surface of revolution.

3. The apparatus (1) according to claim 2, wherein the conical rollers (9) are each mounted for rotation about an axis of rotation (10) and the respective axis of rotation (10) encloses an acute angle of inclination (15), in a plane of inclination (14) which is directed orthogonally to the feed motion (7), with a sawing gap plane (6) formed by the sawing gap (5), and the main product (3) bears at least partially on the respective separating edge (13).

4. The apparatus (1) according to claim 3, wherein the respective axis of rotation (10) encloses an acute angle of incidence (16), in the sawing gap plane (6), with the plane of inclination (14), which is directed orthogonally to the feed motion (7), and the base surfaces (11) of the conical rollers (9) each face counter to the feed motion (7) of the sawn timber package (2) and form sliding planes for the side product (3) to be deflected.

5. The apparatus (1) according to claim 1, wherein the conical rollers (9) each have a lateral surface (12) and a flat base surface (11), and the respective base surface (11) forms the first surface of revolution and the respective lateral surface (12) forms the second surface of revolution.

6. The apparatus (1) according to claim 5, wherein the conical rollers (9) are each rotatably mounted about an axis of rotation (10), the respective axis of rotation (10) encloses an acute tilting angle (18) with a sawing gap plane (6) formed by the sawing gap (5) in a tilting plane (17), which is directed parallel to the feed motion (7) and orthogonally to the sawing gap plane (6) formed by the sawing gap (5).

7. The apparatus (1) according to claim 1, wherein the conical rollers (9) each have a drive, which is configured to impart a rotational movement to each of the conical rollers (9), and in a region of the respective separating edge (13) engaging in the sawing gap (5), the conical rollers (9) have a tangential speed which is directed at least partially in or counter to the feed motion.

8. The apparatus (1) according to claim 1, further comprising a centring unit arranged in front of the conical rollers (9) in relation to the feed direction (7) and is configured to align the sawn timber package (2) with respect to the conical rollers (9) in the feed motion.

9. The apparatus (1) according to claim 1, further comprising a positioning device (18) configured to at least one of move or rotate each of the conical rollers (9) relative to the sawn timber package (2) at least one of along or about at least one adjusting axis.

* * * * *